(12) United States Patent
Kannan et al.

(10) Patent No.: US 7,787,373 B2
(45) Date of Patent: Aug. 31, 2010

(54) METHOD AND APPARATUS FOR PROVIDING SECURE BLAST CALLS

(75) Inventors: Vijay Arumugam Kannan, Mountain View, CA (US); Parameswaran Kumarasamy, San Jose, CA (US); Kavithadevi Parameswaran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 602 days.

(21) Appl. No.: 11/735,301

(22) Filed: Apr. 13, 2007

(65) Prior Publication Data

US 2008/0025293 A1 Jan. 31, 2008

Related U.S. Application Data

(63) Continuation-in-part of application No. 11/460,219, filed on Jul. 26, 2006.

(51) Int. Cl.
*H04L 12/26* (2006.01)
(52) U.S. Cl. ........................ 370/230; 713/155
(58) Field of Classification Search ......... 370/401–410, 370/465, 419–426; 379/202–207.01, 207.13–207.15; 713/155–156, 200–201, 223–229; 709/204–205, 709/223–224, 227–228
See application file for complete search history.

(56) References Cited

U.S. PATENT DOCUMENTS

| 5,434,920 | A | * | 7/1995 | Cox et al. | 380/257 |
|---|---|---|---|---|---|
| 5,974,142 | A | * | 10/1999 | Heer et al. | 379/442 |
| 6,490,679 | B1 | * | 12/2002 | Tumblin et al. | 713/155 |
| 7,089,211 | B1 | * | 8/2006 | Trostle et al. | 705/51 |
| 7,260,716 | B1 | * | 8/2007 | Srivastava | 713/163 |
| 7,383,436 | B2 | * | 6/2008 | Srivastava et al. | 713/163 |
| 2002/0106085 | A1 | * | 8/2002 | Jain et al. | 380/277 |
| 2005/0097317 | A1 | * | 5/2005 | Trostle et al. | 713/163 |
| 2006/0046692 | A1 | * | 3/2006 | Jelinek et al. | 455/411 |
| 2006/0112417 | A1 | * | 5/2006 | Son et al. | 726/3 |
| 2008/0019381 | A1 | * | 1/2008 | Mills et al. | 370/401 |
| 2008/0037518 | A1 | | 2/2008 | Kumarasamy et al. | |
| 2008/0256611 | A1 | * | 10/2008 | Gmuender et al. | 726/4 |
| 2009/0296924 | A1 | * | 12/2009 | Oksman et al. | 380/30 |

\* cited by examiner

*Primary Examiner*—Thai D Hoang
(74) *Attorney, Agent, or Firm*—Schwegman, Lundberg & Woessner, P.A.

(57) ABSTRACT

Various embodiments provide a method and apparatus for providing secure blast calls. An example embodiment includes a secure blast call apparatus including a blast component to determine if a secure or a non-secure call connection is needed and to blast a call connection invite to a plurality of destination endpoints; and a connection component to determine if a responding destination endpoint is a secure or a non-secure destination endpoint, to establish a connection with a secure destination endpoint if a secure call connection is needed, and to establish a connection with a non-secure destination endpoint if a non-secure call connection is needed.

28 Claims, 8 Drawing Sheets

METHOD AND APPARATUS FOR PROVIDING SECURE BLAST CALLS

This patent application is a continuation-in-part of co-pending patent application Ser. No. 11/460,219 filed Jul. 26, 2006; assigned to the same assignee as the present patent application.

TECHNICAL FIELD

The disclosed subject matter relates to the field of network communications, and more particularly to voice over Internet Protocol (VoIP) communications.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006 Cisco Systems, Inc. All Rights Reserved.

BACKGROUND

Voice over Internet Protocol (VoIP) is being increasingly used by customers for local, long distance and international calls. The Session Initiation Protocol (SIP) is a well-known application-layer control (signaling) protocol for creating, modifying, and terminating sessions with one or more participants. These sessions include Internet telephone calls, multimedia distribution, and multimedia conferences.

Blast calls is a common term which is used in scenarios including situations where: 1) multiple destinations are alerted simultaneously in response to an incoming call setup; 2) the call is then conferenced to the first destination that answers; and 3) calls to the other alerting destinations are terminated. Blast Call functionality is used in many features in, for example, customer installations in different forms such as Parallel Hunt groups, Shared lines (e.g. SIP), call forking scenarios in SIP proxies, etc.

Currently, there is no effective method to support or address blast calls with secured media. Secure blast call functionality is needed for many well-known and predominantly used features, such as shared lines, parallel hunt groups, etc. Thus, a method and apparatus for providing secure blast calls is needed.

DETAILED DESCRIPTION

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter.

As described further below, according to various example embodiments of the disclosed subject matter described herein, there is provided a method and apparatus for providing secure blast calls.

Figure 1:
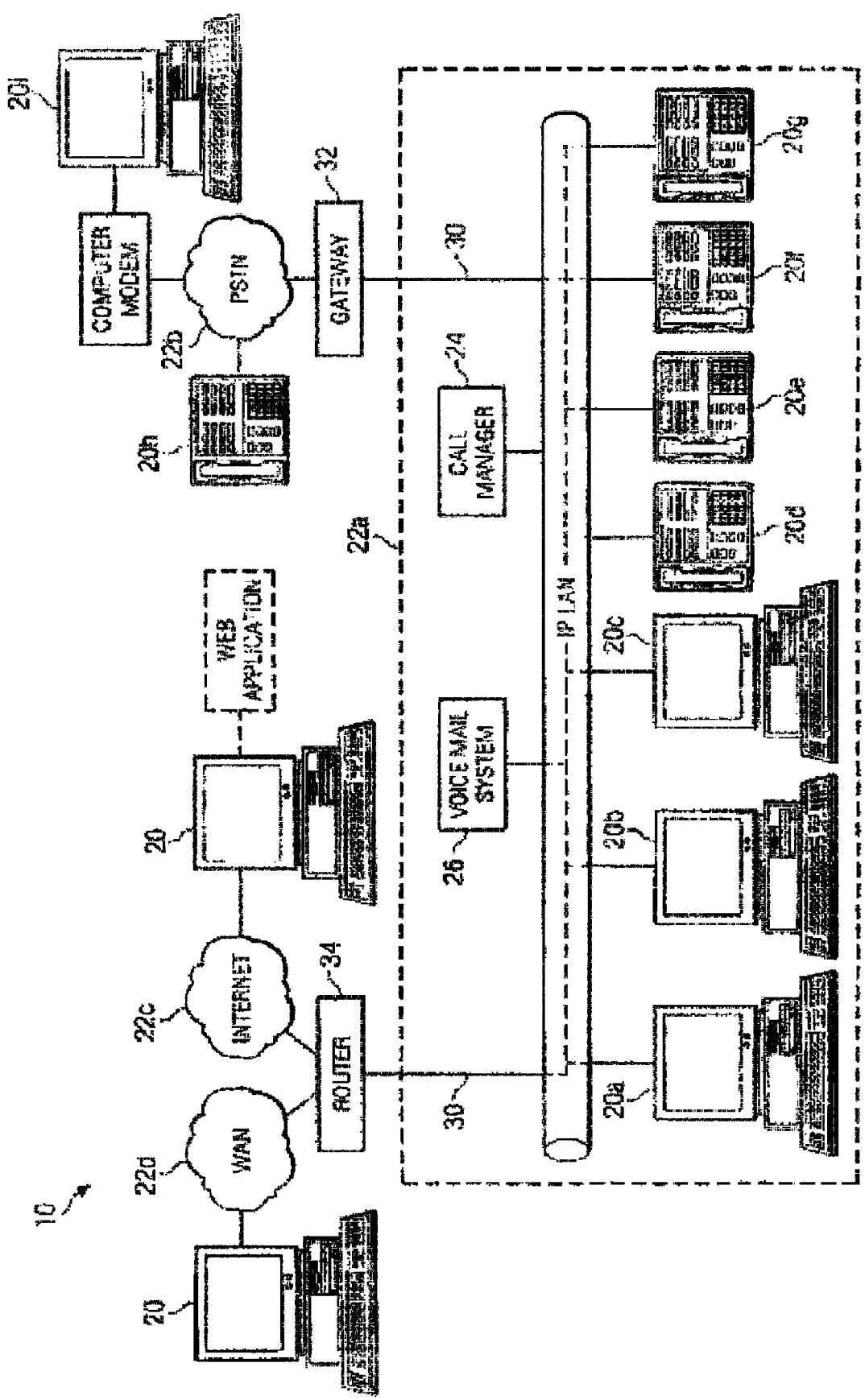
FIG. 1 illustrates a VoIP network environment in which various embodiments can operate.

FIG. 1 illustrates an example of a communications system 10 for implementing a voice-over-Internet Protocol (VoIP) system. System 10 includes a plurality of endpoints 20 having the ability to establish communication sessions between each other, using one or more of communication networks 22a-22d. System 10 also includes one or more call managers 24 that cooperate with a voice mail system 26 to manage incoming calls and other communications for endpoints 20. In the illustrated embodiment, system 10 includes a local area network (LAN) 22a, a Public Switched Telephone Network (PSTN) 22b, a public network 22c, and a wide area network (WAN) 22d, which cooperate to provide communication services to the variety of types of 30 endpoints 20 within system 10. Specifically, LAN 22a couples multiple endpoints 20a-20g for the establishment of communication sessions between endpoints 20a-20g and other endpoints 20 distributed across multiple cities and geographic regions. Generally, LAN 22a provides for the communication of packets, cells, frames, or other portions of information (generally referred to as packets herein) between endpoints 20. Accordingly, LAN 22a may include any combination of network components, gatekeepers, call managers, routers, hubs, switches, gateways, endpoints, or other hardware, software, or embedded logic implementing any number of communication protocols that allow for the exchange of packets in communication system 30. In the illustrated embodiment, LAN 22a includes a plurality of segments 30 that couple endpoints 20a-20g with call manager 24, voice mail system 26, gateway 32, 15 router 34, and communication networks 22b-22d. Specifically, segments 30 couple endpoints 20a-20g with PSTN 22b, Internet 22c, and WAN 22d to allow communication with various devices located outside of LAN 22a. Because both audio and/or video telecommunication 20 signals may be communicated over LAN 22a, LAN 22a may eliminate the need, in certain embodiments, for a separate telephone network, such as a private branch exchange (PBX), to provide telecommunication services within a business or other organization.

Although the illustrated embodiment includes four communication networks 22a-22d, the configuration of networks 22a-22d are provided as merely one example configuration of a system 10 for establishing communication sessions between and among system components. The term "communication network" should be interpreted as generally including any network capable of transmitting audio and/or video telecommunication signals, data, and/or messages, including signals, data, or messages transmitted through text chat, instant messaging, and e-mail (referred to herein generally as media). Any one of networks 22a-22d may be implemented as a local area network (LAN), wide area network (WAN), global distributed network such as the Internet, Intranet, Extranet, or any other form of wireless or wireline communication network. It is generally recognized that system 10 may include any combination of networks and that system 10 may include fewer or more networks 22a-22d as is required by the number of endpoints 20 or the desired traffic across system 10.

In various embodiments, communication network 10 employs voice communication protocols that allow for the addressing or identification of endpoints, nodes, and/or call managers coupled to communication network 10. For example, LAN 22a may be an Internet Protocol (IP) network or any other type of network that allows each of the components coupled together by LAN 22a in communication system 10 to be identified using IP addresses. IP networks transmit data (including telecommunication data/signals) by placing the data in packets and sending the packets individually to the selected destination. This may be referred to as a packet network. Other types of packet networks include ATM, Frame Relay, Ethernet, SNA, and SONET networks, among others. Unlike a circuit-switched network (e.g., PSTN 22b), dedicated bandwidth is not required for the duration of a communication session over LAN 22a. Instead, each endpoint sends packets as they become available for transmission. In this manner, network 10 may support any form and/or combination of point-to-point, multicast, unicast, or other techniques for exchanging VoIP media packets among components in communication system 10. Any network components capable of exchanging audio, video, or other data using frames or packets, are included within the scope of the various embodiments described and claimed herein.

The technology that allows communication signals to be transmitted over an IP network may be referred to as Voice over IP (VoIP). In various embodiments, one or more of endpoints 20a-20g may include an IP telephony device. IP telephony devices have the capability of encapsulating a user's voice (or other inputs) into IP packets so that the voice can be transmitted over LAN 22a (as well as Internet 22c and WAN 22d, which may also be packet networks). IP telephony devices may include telephones, fax machines, computers running telephony software, and any other devices capable of performing telephony functions over an IP network.

Call manager 24 controls IP telephony devices within LAN 22a. Call manager 24 is an application that controls call processing, routing, telephony device features and options (such as call hold, call transfer and caller ID), device configuration, and other telephony functions and parameters within communications system 10. When a user wishes to place a call from one telephony device, such as endpoint 20d, to another telephony device, such as endpoint 20e, on LAN 22a, the calling device transmits signaling to call manager 24 indicating the desired function and destination. Call manager 24 then instructs endpoints 20d and 20e to establish a network connection between themselves over LAN 22a. Once endpoints 20d and 20e have established a connection, a codec (coder/decoder) converts the voice or other telecommunication signals generated by the users of endpoints 20d and 20e from analog signals into digital form. Endpoints 20d and 20e may implement the codec either in software or as special-purpose hardware. For example, for a voice communication sent from endpoint 20d to endpoint 20e, the codec in endpoint 20d digitizes the outgoing telecommunication signals. Endpoint 20d then encapsulates the digital telecommunication data within IP packets so that the data can be transmitted over LAN 22a. This encapsulation is typically performed by Real-Time Transport Protocol (RTP) running over UDP/IP (User Datagram Protocol/Internet Protocol). The encapsulation process is well-known in the art, and will not be described in further detail. The IP packets are then transported over LAN 22a via the IP protocol to endpoint 20e and other endpoints participating in the call. A codec in the receiving endpoint 20e then translates the IP packet data into analog voice signals for presentation to the user. This process is repeated each time that a call participant (or other source) generates telecommunication signals.

In addition to intra-LAN telephone calls, calls can also be placed to non-IP telephony devices, such as endpoint 20h, that are connected to PSTN 22b. PSTN 22b includes switching stations, central offices, mobile telephone switching offices, pager switching offices, remote terminals, and other related telecommunications equipment that are located throughout the world. Calls placed to endpoint 20h are made through VoIP-to-PSTN gateway 32. Gateway 32 converts analog or digital circuit-switched data transmitted by PSTN 22b or a PBX) to packet data transmitted by LAN 22a, and vice-versa. Gateway 32 also translates between the VoIP call control system protocol and the Signaling System 7 (SS7) or other protocols used in PSTN 22b. For example, when making a call to a PSTN endpoint 20h from an IP endpoint 20d, the telecommunication signal generated by the user of endpoint 20d is digitized and encapsulated, as described above. The packets are then transmitted over LAN 22a to gateway 32. Gateway 32 converts the data in the packets to the format (either digital or analog) used by PSTN 22b. The voice signals are then sent to the PSTN endpoint 20h over PSTN 22b. This process is continued between LAN 22a and PSTN 22b through gateway 32 until the call is complete. Calls also may be made between IP telephony devices, such as endpoint 20d, and other IP telephony devices located on Internet 22c or across WAN 22d. Again, the telecommunication data is digitized and encapsulated into IP packets at the telephony device. However, unlike communications with devices on PSTN 22b, a gateway is not needed to convert the IP packets to another format. A router 34 (or other similar device such as a hub or bridge) directs the packets to the IP address of the receiving IP telephony device.

In an example scenario, a first end user may be associated with a first endpoint 20d, which comprises a telephony device, and a second end user may be associated with a second endpoint 20e, which comprises another telephony device. To initiate a communication session, the first end user may use first endpoint 20d to call the second end user at second endpoint 20e. Where the second end user is participating in a previous call or is otherwise unavailable to take the incoming call from the first end user, call manager 24 may intervene by intercepting the call and forwarding the call to voice mail system 26.

In the following sections, example embodiments of a system and method illustrate various ways in which media security can be handled in blast call scenarios. As described above, blast calls is a common term which is used in scenarios including situations where multiple destinations are alerted simultaneously in response to an incoming call setup. In the following description, various scenarios are described where a call originator (denoted herein as the originating gateway or OGW) alerts multiple call destinations (denoted herein as the terminating gateways or TGW's). As well known in the art, conventional TGW's can be secure or non-secure gateways. Secure gateways must swap keys with the OGW prior to the initiation of the call. Non-secure gateways have no requirement to handle security keys.

The various embodiments illustrated in FIGS. 2-7 and described below are presented in the context of a Session Initiation Protocol (SIP). SIP is a well-known application-layer control (signaling) protocol for creating, modifying, and terminating sessions with one or more participants. It will be apparent to those of ordinary skill in the art that other communication protocols may be similarly used to implement the various embodiments described and claimed herein.

In the various embodiments described below, the following possibilities are considered: 1) the originator of the call could be secure and all destinations (e.g. extensions) could be non-secure endpoints; and 2) the originator of the call could be secure and few destinations (e.g. extensions) could be secure and a few destinations could be non-secure.

Figure 2:
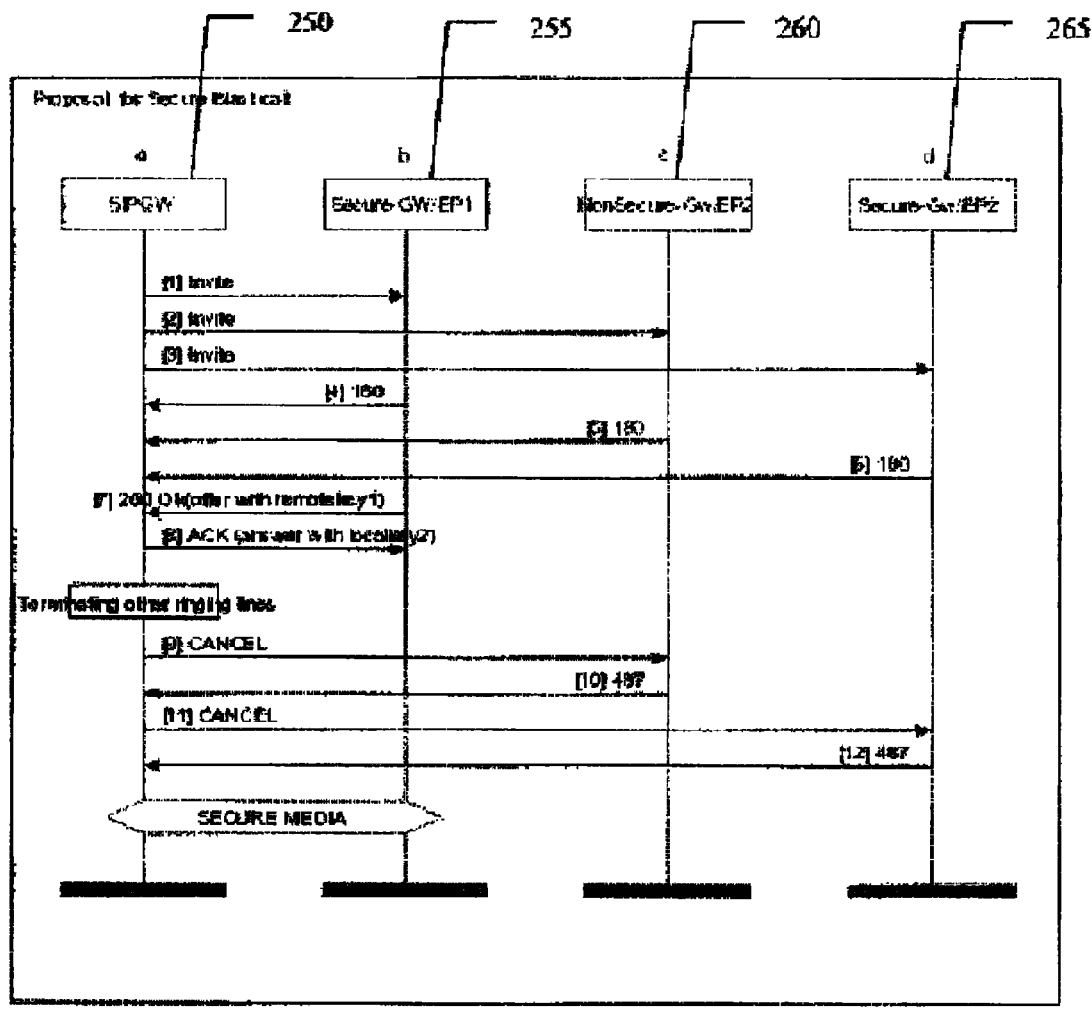
FIGS. 2-7 illustrate various examples of call control processing flows between a plurality of gateways in example embodiments.
Figure 3:
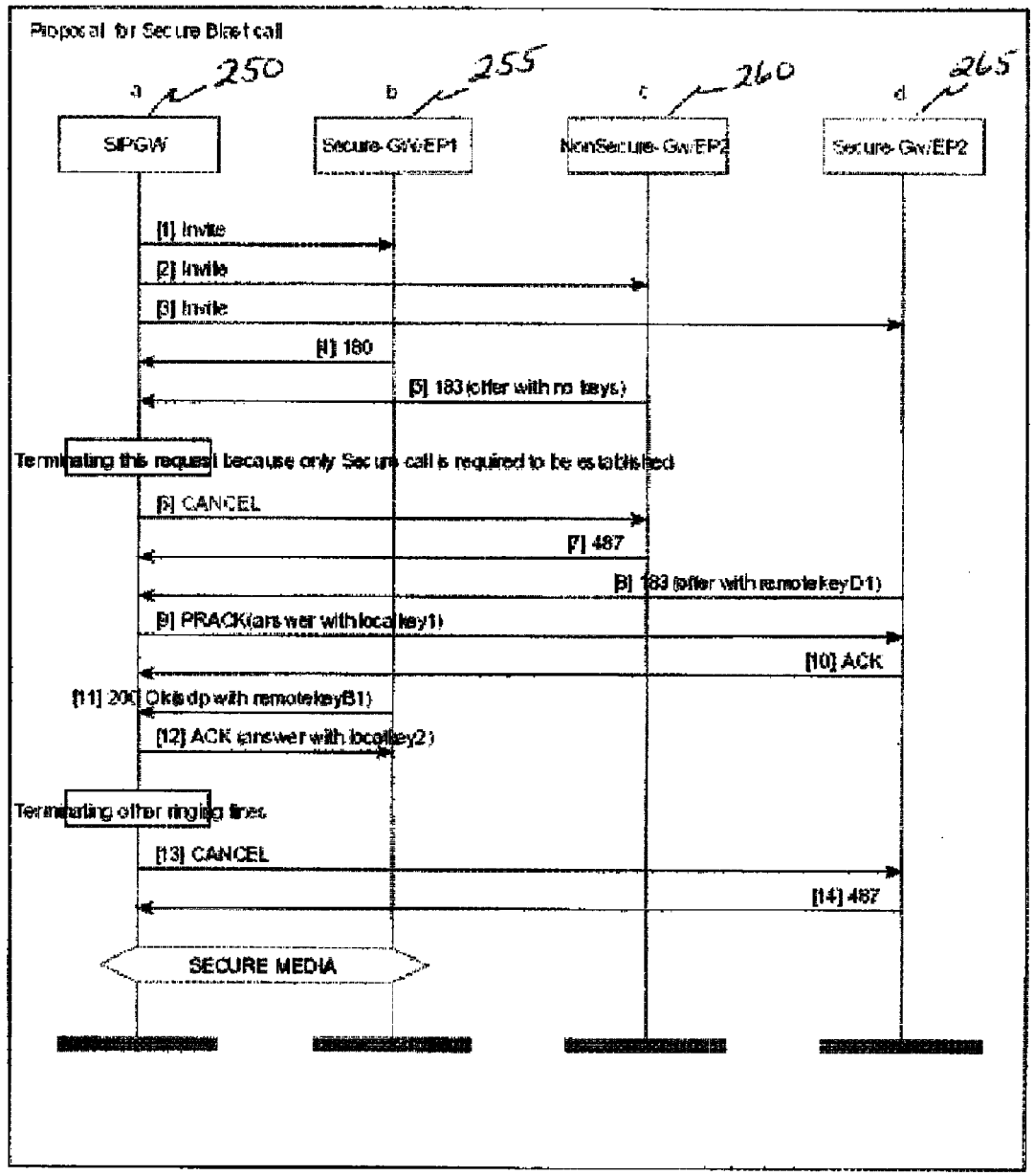

Referring to FIGS. 2-3, let us consider the call flow from the Originating Gateway perspective. As shown in FIG. 2, an OGW 250 is used to blast call at multiple destination TGW's 255, 260, and 265. In this example, TGW 255 is a secure gateway; TGW 260 is a non-secure gateway; TGW 265 is a secure gateway. In the SIP example of FIG. 2, a SIP INVITE message is sent to each of the TGW's 255, 260, and 265. When a call is required to be blast at multiple destinations and it happens to be a secure call, the OGW 250 can send out an INVITE message with no associated offer. Depending on the answers received back from the TGW's 255, 260, and 265 in response to the INVITE message from OGW 250, the OGW 250 can choose to send the security keys after at least one of the destination TGW's 255, 260, and 265 answer. It is inefficient to attempt sending security keys to unknown TGW's with the initial INVITE message.

In the example of FIG. 2, the SIP INVITE message is sent to each of the TGW's 255, 260, and 265 in operations 1, 2, and 3. At operations 4, 5, and 6, a SIP 180 type response (e.g. a form of provisional response from a destination) is received from each of the TGW's 255, 260, and 265, respectively. At step 7, secure TGW 255 further responds with a SIP 200 type message that represents an offer to OGW 250 with a remote key 1 corresponding to a security key associated with TGW 255. At operation 8, OGW 250 acknowledges the SIP 200 type message from TGW 255 with an answer that includes a local key 2 corresponding to a security key associated with OGW 250. At this point, a secure connection has been established between OGW 250 and TGW 255. The Invites to the other TGW's (i.e. TGW's 260 and 265) can be cancelled (i.e. operations 9 and 11) and the secure media connection can be used between OGW 250 and TGW 255.

Referring to FIG. 3, an OGW 250 is used to blast call at multiple destination TGW's 255, 260, and 265. In this example, TGW 255 is a secure gateway; TGW 260 is a non-secure gateway; TGW 265 is a secure gateway. In the SIP example of FIG. 3, a SIP INVITE message is sent to each of the TGW's 255, 260, and 265. When a call is required to be blast at multiple destinations and it happens to be a secure call, the OGW 250 can send out an INVITE message with no associated offer. Depending on the answers received back from the TGW's 255, 260, and 265 in response to the INVITE message from OGW 250, the OGW 250 can choose to send the security keys after at least one of the destination TGW's 255, 260, and 265 answer.

In the example of FIG. 3, the SIP INVITE message is sent to each of the TGW's 255, 260, and 265 in operations 1, 2, and 3. At operations 4, 5, and 8, various forms of provisional responses are received from each of the TGW's 255, 260, and 265. In this example, a SIP 180 type response is received from TGW 255; a SIP 183 type response (an offer with no keys) is received from TGW 260; a SIP 183 type response (an offer with a remote key associated with the TGW 265) is received from TGW 265. At step 8, secure TGW 265 has responded with a SIP 183 type message that represents an offer to OGW 250 with a remote key D1 corresponding to a security key associated with TGW 265. At operation 9, OGW 250 responds to the SIP 183 type message from TGW 265 with a provisional answer message that includes a local key 1 corresponding to a security key associated with OGW 250. However, OGW 250 is looking for a secure media connection and therefore cancels the invite to TGW 260 at operation 6. Then at operation 11, OGW 250 receives a SIP 200 type response from TGW 255, the 200 type response including a remote key B1 associated with TGW 255. At operation 12, OGW 250 responds to the SIP 200 type message from TGW 255 with an answer message that includes a local key 2 corresponding to a security key associated with OGW 250. At this point, a secure connection has been established between OGW 250 and TGW 255. The Invite to TGW 265 can be cancelled (i.e. operations 13 and 14) and the secure media connection can be used between OGW 250 and TGW 255.

In the example of FIG. 3, an offer is received from the destinations in Provisional Responses (18x), so the OGW 250 may be required to generate more than one key. Depending on which destination answers the phone first, the corresponding exchanged keys are used for transfer of the secure media.

Figure 4:
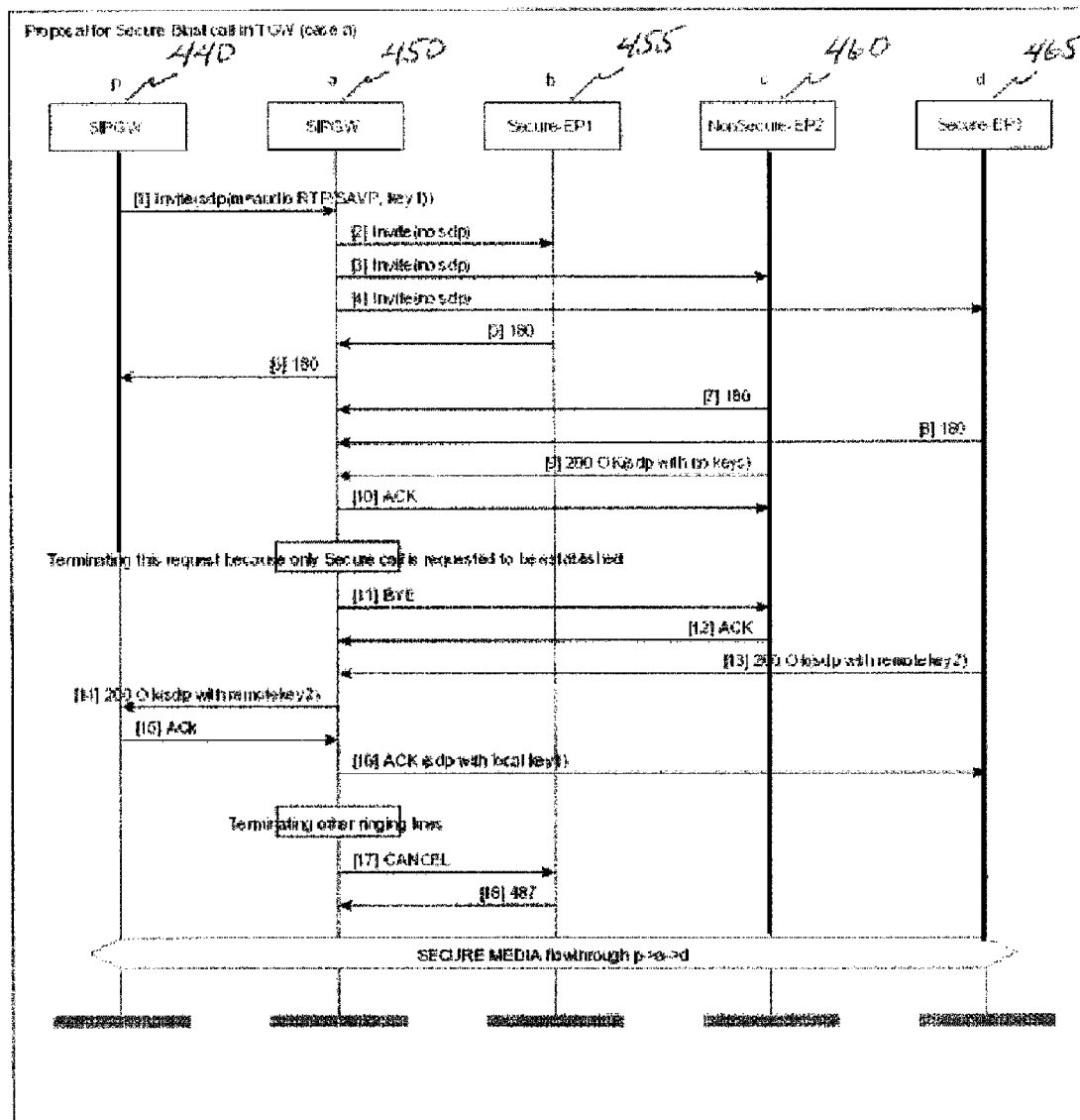

Referring now to FIGS. 4-7, let us consider the call flow from the perspective of the Terminating Gateway. In the examples of FIGS. 4-7, gateway 450 acts as a terminating gateway TGW 450. As shown in FIG. 4 in operation 1, an Invite, with session description protocol (SDP) information and a security key as sent from an OGW 440 arrives at the TGW 450. In this case, TGW 450 is being used to blast a call to various extensions/lines. Some of these extensions/lines may be secure and others of them may be non-secure. In its conventional implementation, the session description protocol (SDP) has a particular syntax for specifying, among other information, an internet protocol (IP) address and a Real-time Transport Protocol (RTP) port number. The Real-time Transport Protocol (RTP) defines a standardized packet format for delivering audio and video over the Internet. It was developed by the Audio-Video Transport Working Group of the IETF and first published in 1996 as RFC 1889, which was obsoleted in 2003 by RFC 3550.

In its conventional implementation, RTP does not have a standard TCP or User Datagram Protocol (UDP) port on which it communicates. The only standard that RTP obeys is that UDP communications are done via an even port and the next higher odd port is used for RTP Control Protocol (RTCP) communications. RTP can carry any data with real-time characteristics, such as interactive audio and video. Call setup and tear-down is usually performed by the conventional SIP protocol.

As shown in FIG. 4, the TGW 450 could potentially send out an INVITE with no Offer (e.g. no SDP information and no security key) to the other target gateways (TGW 455, 460, and 465). However, some of these extensions/lines may be secure and others of them may be non-secure. Additionally, when the first destinations respond with an answer, the TGW 450 can behave, in various example embodiments, accordingly as depicted in FIGS. 4-7 and described for each of the cases described below.

Case a:—As illustrated for the first case in FIG. 4, the Invite with only a Secure Real Time Transport Protocol (SRTP) (m-line) and a security key (1) is included in the offer from OGW 440 to TGW 450. In this case, a few target gateway endpoints are secure (TGW 455 and TGW 465) and few are non-secure (TGW 460). In response to receiving the Invite from OGW 440, TGW 450 sends a SIP INVITE message to each of the TGW's 455, 460, and 465 in operations 2-4. At operations 5, 7, and 8, a SIP 180 type response (e.g. a form of provisional response from a destination) is received from each of the TGW's 455, 460, and 465, respectively. At step 6, TGW 450 responds to OGW 440 with a SIP 180 type response. In operations 9 and 10, the non-secure TGW 460 may respond with a SIP type 200 response with SDP information but without a security key. Because TGW 460 is a non-secure destination, it would not be expected to return a security key. However, the TGW 450 is looking for a secure destination, so the Invite to TGW 460 is terminated at operation 11 and acknowledged at operation 12. In operation 13, secure gateway TGW 465 may further respond to the Invite from TGW 450 with a SIP 200 type message that represents an offer to TGW 450 with SDP information and a remote key 2 corresponding to a security key associated with TGW 465. In this case, a secure extension picks up the phone. At operation 14, TGW 450 forwards the SIP 200 type message from TGW 465 to OGW 440. OGW sends an acknowledgement to TGW 450 at operation 15. TGW 450 forwards the acknowledgement to TGW 465 in operation 16. At this point, a secure connection has been established with the first-responding secure gateway TGW 465. At operation 17, the prior Invites to other extension lines are terminated. The secure media connection can be used between OGW 440 and TGW 465.

Figure 5:
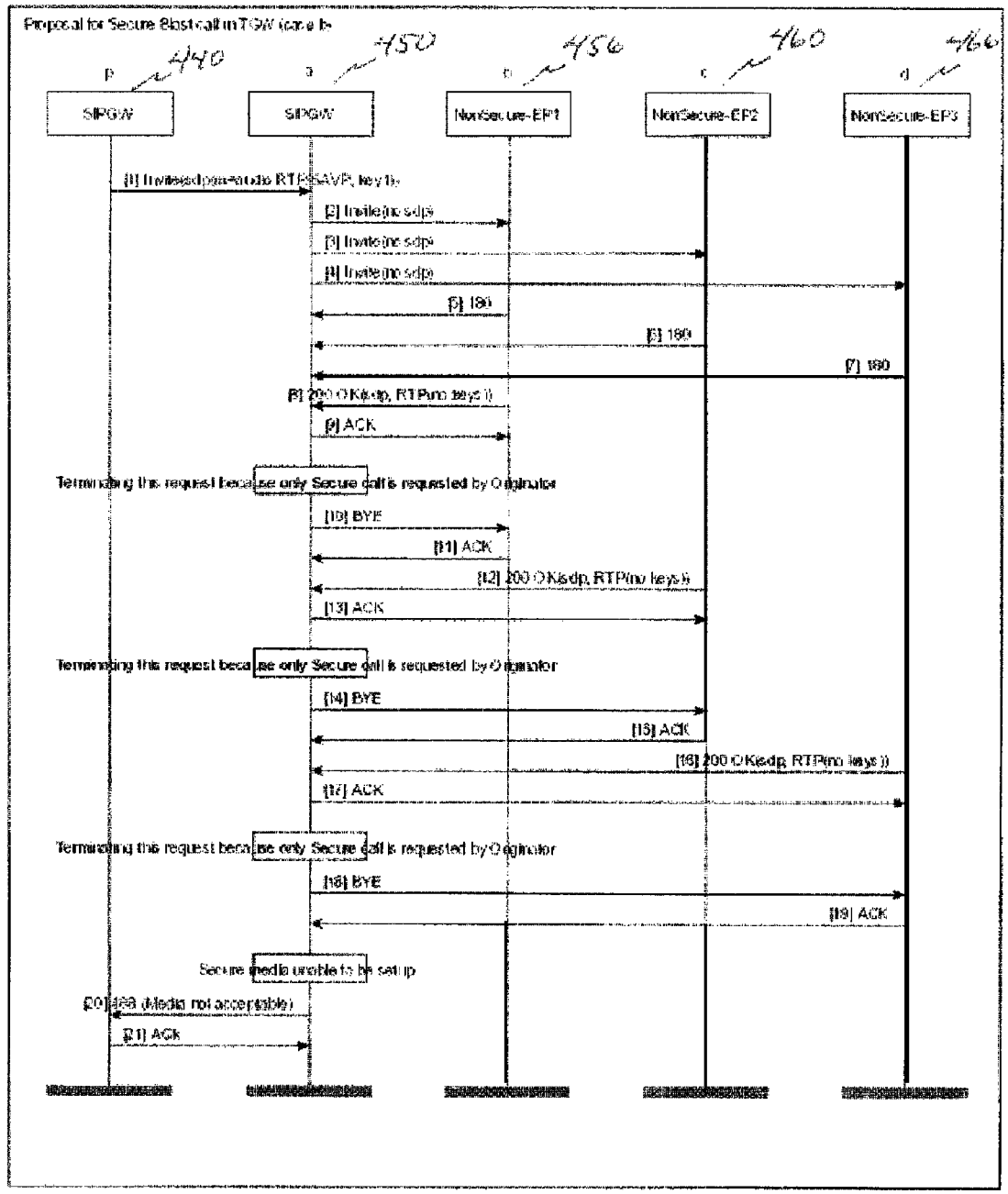

Case b:—As illustrated for the second case in FIG. 5, the Invite with only an SRTP (m-line) and a security key (1) is included in the offer from OGW 440 to TGW 450. In this case, all endpoints are non-secure (TGW 456, TGW 460, and TGW 466). In response to receiving the Invite from OGW 440, TGW 450 sends a SIP INVITE message to each of the destination gateways, TGW 456, TGW 460, and TGW 466 in operations 2-4. At operations 5, 6, and 7, a SIP 180 type response (e.g. a form of provisional response from a destination) is received from each of the destination gateways, TGW 456, TGW 460, and TGW 466, respectively. In operation 8, a non-secure TGW 456 may respond with a SIP type 200 response with SDP information but without a security key. Because TGW 456 is a non-secure destination, it would not be expected to return a security key. Similarly, in operations 12 and 16, non-secure TGW's 460 and 466 may also respond with a SIP type 200 response with SDP information but without a security key. However, the TGW 450 is looking for a secure destination, so the Invites to non-secure destination gateways, TGW 456, TGW 460, and TGW 466 are terminated at operations 10, 14, and 18 and acknowledged at operations 11, 15, and 19. At operation 20, TGW 450 forwards a SIP 488 type message to OGW 440 to notify OGW 440 that a secure connection could not be made. OGW sends an acknowledgement to TGW 450 at operation 21. At this point, a secure connection could not be established with a secure gateway. Therefore the call setup terminates unsuccessfully.

Figure 6:
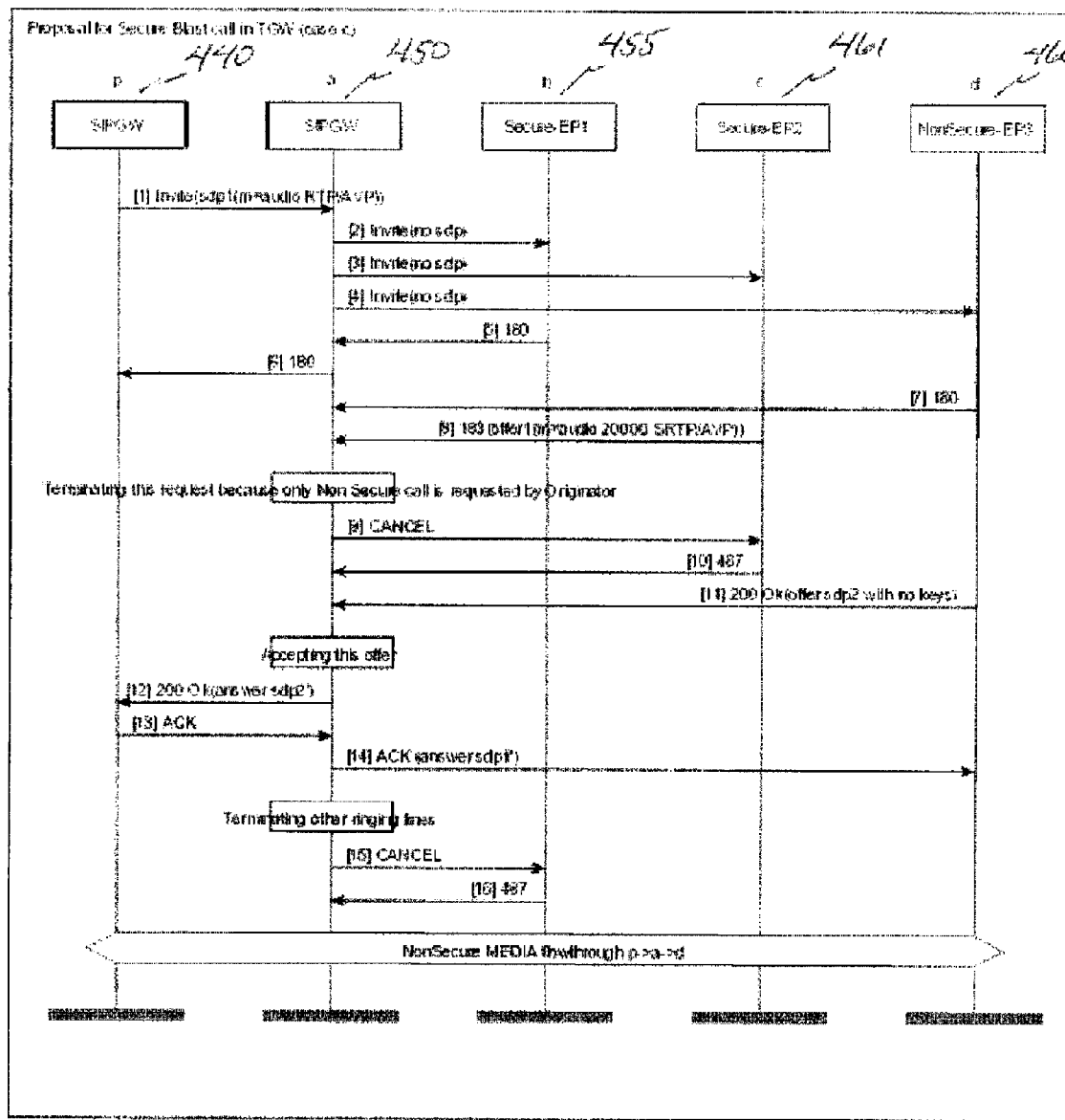

Case c:—As illustrated for the third case in FIG. 6, the Invite with only a non-secure RTP (m-line) and no security key is included in the offer from OGW 440 to TGW 450. In this case, the OGW 440 seeks to establish a non-secure connection with an extension line corresponding to the target gateway endpoints. In this case, a few target gateway endpoints are secure (TGW 455 and TGW 461) and few are non-secure (TGW 466). In response to receiving the Invite from OGW 440, TGW 450 sends a SIP INVITE message to each of the TGW's 455, 461, and 466 in operations 2-4. At operations 5 and 7, a SIP 180 type response (e.g. a form of provisional response from a destination) is received from each of the TGW's 455 and 466, respectively. At step 6, TGW 450 responds to OGW 440 with a SIP 180 type response. In operation 8, a secure TGW 461 may respond with a SIP type 183 response with an offer for a secure connection. However, the TGW 450 is looking for a non-secure destination, so the Invite to TGW 461 is terminated at operation 9 and acknowledged at operation 10. In operation 11, non-secure gateway TGW 466 may further respond to the Invite from TGW 450 with a SIP 200 type message that represents an offer to TGW 450 with no security key. In this case, a non-secure extension picks up the phone. At operation 12, TGW 450 forwards the SIP 200 type message from TGW 466 to OGW 440. OGW sends an acknowledgement to TGW 450 at operation 13. TGW 450 forwards the acknowledgement to TGW 466 in operation 14. At this point, a non-secure connection has been established with the first-responding non-secure gateway TGW 466. At operation 15, the prior Invites to other extension lines are terminated. The non-secure media connection can be used between OGW 440 and TGW 466.

Figure 7:
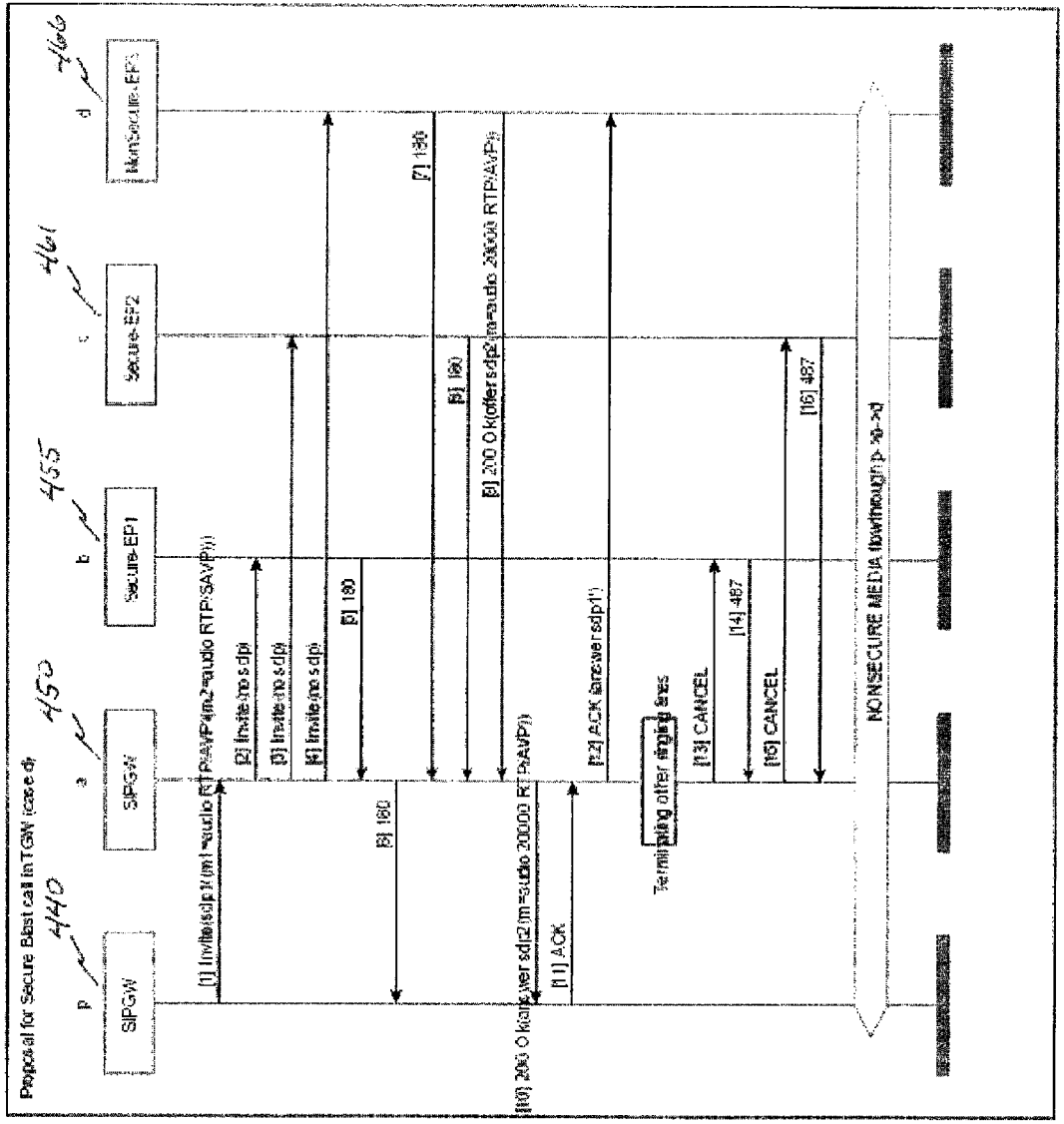

Case d:—As illustrated in FIG. 7, the Invite with both SRTP and non-secure RTP(m-lines) is included in the offer from OGW 440 to TGW 450. In this case, the OGW 440 seeks to establish either a non-secure or a secure connection with an extension line corresponding to the target gateway endpoints. In this case, a few target gateway endpoints are secure (TGW 455 and TGW 461) and few are non-secure (TGW 466). In response to receiving the Invite from OGW 440, TGW 450 sends a SIP INVITE message to each of the TGW's 455, 461, and 466 in operations 2-4. At operations 5, 7, and 8, a SIP 180 type response (e.g. a form of provisional response from a destination) is received from each of the TGW's 455, 466, and 461, respectively. At step 6, TGW 450 responds to OGW 440 with a SIP 180 type response. In operation 9, a non-secure TGW 466 may respond with a SIP type 200 response with an offer for a non-secure connection, such offer not including a security key. In this case, a non-secure extension picks up the phone. Because, the TGW 450 is looking for either a secure or a non-secure destination, at operation 10, TGW 450 forwards the SIP 200 type message from TGW 466 to OGW 440. OGW sends an acknowledgement to TGW 450 at operation 11. TGW 450 forwards the acknowledgement to TGW 466 in operation 12. At this point, a non-secure connection has been established with the first-responding gateway TGW 466. At operations 13 and 15, the prior Invites to other extension lines are terminated. The non-secure media connection can be used between OGW 440 and TGW 466.

Figure 8:
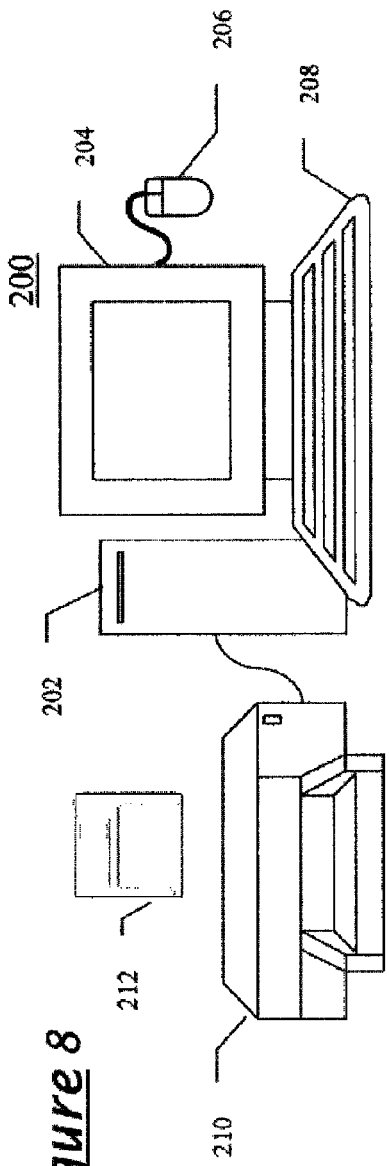
FIGS. 8 and 9 illustrate an example of a computer system on which processing for various embodiments can be implemented.
Figure 9:
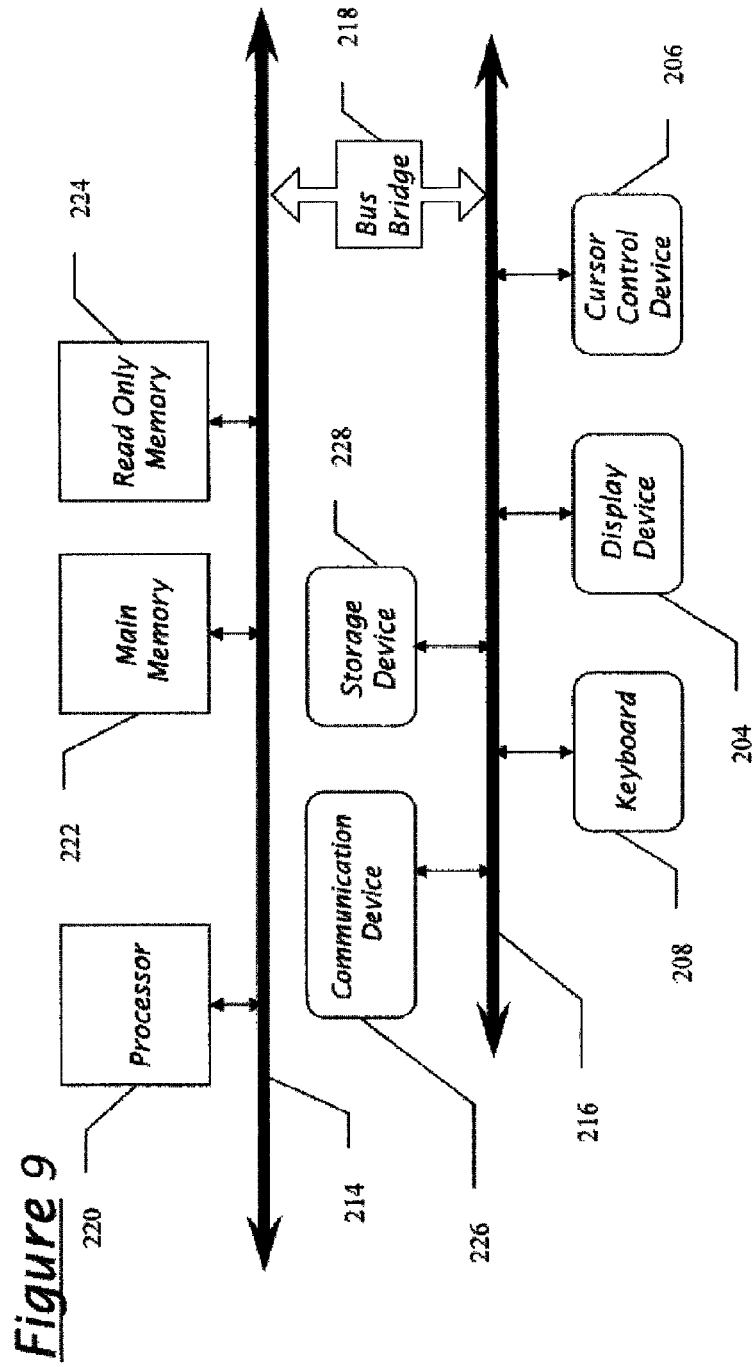

Having described above various embodiments of the network environment in which embodiments may operate, FIGS. 8 and 9 show an example of a computer system 200 illustrating an exemplary host, client 280, or server 250 computer system, in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 280 can be implemented as a network computer or thin client device. Client 280 may also be a laptop or palm-top computing device, such as the Palm Pilot™. Client 280 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 250, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 250 via a conventional network infrastructure such as the infrastructure illustrated and described above.

The system of an example embodiment includes software, information processing hardware, and various processing steps, which are described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of data structures may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

The software and/or data described herein may further be transmitted or received over a network 260 via the communication device 226 utilizing any one of a number of well-known transfer protocols, for example, the hyper text transfer protocol (HTTP). While the machine-readable medium 212 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, a method and apparatus for providing secure blast calls is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
   determining if a secure or a non-secure call connection is needed;
   blasting a call connection invite to a plurality of destination endpoints, blasting the call connection including sending the invite to the plurality of destination endpoints concurrently;
   determining if a responding destination endpoint is a secure or a non-secure destination endpoint, a response to the invite from a secure destination endpoint including a security key, a response to the invite from a non-secure destination endpoint including no security key;
   establishing a connection with a secure destination endpoint if a secure call connection is needed; and
   establishing a connection with a non-secure destination endpoint if a non-secure call connection is needed.

2. The method as claimed in claim 1 including receiving a response from a secure destination endpoint, the response including a security key.

3. The method as claimed in claim 1 including receiving a response from a non-secure destination endpoint, the response including no security key.

4. The method as claimed in claim 1 wherein the connection is established with a first answering secure destination endpoint if a secure call connection is needed.

5. The method as claimed in claim 1 wherein the connection is established with a first answering non-secure destination endpoint if a non-secure call connection is needed.

6. The method as claimed in claim 1 wherein the invite is a SIP message.

7. The method as claimed in claim 1 including terminating the invite sent to a destination endpoint with which no connection is established.

8. An apparatus comprising:
   means for determining if a secure or a non-secure call connection is needed;
   means for blasting a call connection invite to a plurality of destination endpoints, blasting the call connection including sending the invite to the plurality of destination endpoints concurrently;

means for determining if a responding destination endpoint is a secure or a non-secure destination endpoint, a response to the invite from a secure destination endpoint including a security key, a response to the invite from a non-secure destination endpoint including no security key;

means for establishing a connection with a secure destination endpoint if a secure call connection is needed; and means for establishing a connection with a non-secure destination endpoint if a non-secure call connection is needed.

9. The apparatus as claimed in claim 8 including means for receiving a response from a secure destination endpoint, the response including a security key.

10. The apparatus as claimed in claim 8 including means for receiving a response from a non-secure destination endpoint, the response including no security key.

11. The apparatus as claimed in claim 8 wherein the connection is established with a first answering secure destination endpoint if a secure call connection is needed.

12. The apparatus as claimed in claim 8 wherein the connection is established with a first answering non-secure destination endpoint if a non-secure call connection is needed.

13. The apparatus as claimed in claim 8 wherein the invite is a SIP message.

14. The apparatus as claimed in claim 8 including means for terminating the invite sent to a destination endpoint with which no connection is established.

15. A secure blast call apparatus comprising:
a blast component to determine if a secure or a non-secure call connection is needed and to blast a call connection invite to a plurality of destination endpoints, blasting the call connection including sending the invite to the plurality of destination endpoints concurrently, a response to the invite from a secure destination endpoint including a security key, a response to the invite from a non-secure destination endpoint including no security key; and a connection component to determine if a responding destination endpoint is a secure or a non-secure destination endpoint, to establish a connection with a secure destination endpoint if a secure call connection is needed, and to establish a connection with a non-secure destination endpoint if a non-secure call connection is needed.

16. The apparatus as claimed in claim 15 wherein the connection component being further configured to receive a response from a secure destination endpoint, the response including a security key.

17. The apparatus as claimed in claim 15 wherein the connection component being further configured to receive a response from a non-secure destination endpoint, the response including no security key.

18. The apparatus as claimed in claim 15 wherein the connection component being further configured to establish a connection with a first answering secure destination endpoint if a secure call connection is needed.

19. The apparatus as claimed in claim 15 wherein the connection component being further configured to establish a connection with a first answering non-secure destination endpoint if a non-secure call connection is needed.

20. The apparatus as claimed in claim 15 wherein the invite is a SIP message.

21. The apparatus as claimed in claim 15 wherein the connection component being further configured to terminate the invite sent to a destination endpoint with which no connection is established.

22. A system comprising:
a plurality of network elements including an originating gateway and a plurality of destination endpoints, each of the plurality of network elements including a secure blast call apparatus including a blast component to determine if a secure or a non-secure call connection is needed and to blast a call connection invite to a plurality of destination endpoints, blasting the call connection including sending the invite to the plurality of destination endpoints concurrently; and a connection component to determine if a responding destination endpoint is a secure or a non-secure destination endpoint, a response to the invite from a secure destination endpoint including a security key, a response to the invite from a non-secure destination endpoint including no security key, the connection component to establish a connection with a secure destination endpoint if a secure call connection is needed, and to establish a connection with a non-secure destination endpoint if a non-secure call connection is needed.

23. The system as claimed in claim 22 wherein the connection component being further configured to receive a response from a secure destination endpoint, the response including a security key.

24. The system as claimed in claim 22 wherein the connection component being further configured to receive a response from a non-secure destination endpoint, the response including no security key.

25. The system as claimed in claim 22 wherein the connection component being further configured to establish a connection with a first answering secure destination endpoint if a secure call connection is needed.

26. The system as claimed in claim 22 wherein the connection component being further configured to establish a connection with a first answering non-secure destination endpoint if a non-secure call connection is needed.

27. The system as claimed in claim 22 wherein the invite is a SIP message.

28. The system as claimed in claim 22 wherein the connection component being further configured to terminate the invite sent to a destination endpoint with which no connection is established.

* * * * *